United States Patent
Talghader et al.

(10) Patent No.: US 7,968,846 B2
(45) Date of Patent: Jun. 28, 2011

(54) TUNABLE FINESSE INFRARED CAVITY THERMAL DETECTORS

(75) Inventors: Joseph Talghader, Edina, MN (US); Yuyan Wang, Minneapolis, MN (US); Michael S. Sutton, St. Paul, MN (US)

(73) Assignee: Regents of the University of Minnesota, St. Paul, MN (US)

( * ) Notice: Subject to any disclaimer, the term of this patent is extended or adjusted under 35 U.S.C. 154(b) by 289 days.

(21) Appl. No.: 11/805,240

(22) Filed: May 22, 2007

(65) Prior Publication Data

US 2008/0035846 A1  Feb. 14, 2008

Related U.S. Application Data

(60) Provisional application No. 60/802,751, filed on May 23, 2006.

(51) Int. Cl.
*G01J 5/00* (2006.01)
*G01J 5/52* (2006.01)

(52) U.S. Cl. .................................................. 250/338.1

(58) Field of Classification Search ............ 250/338.1, 250/339.01; 359/278, 579, 581, 589, 872, 359/742, 290
See application file for complete search history.

(56) References Cited

U.S. PATENT DOCUMENTS

| | | | |
|---|---|---|---|
| 5,021,663 A | 6/1991 | Hornbeck | |
| 5,142,414 A | 8/1992 | Koehler | 359/578 |
| 5,286,976 A | 2/1994 | Cole | 250/349 |
| 5,367,167 A * | 11/1994 | Keenan | 250/338.4 |
| 5,550,373 A | 8/1996 | Cole et al. | 250/338.1 |
| 5,589,689 A | 12/1996 | Koskinen | 250/339.01 |
| 5,629,521 A | 5/1997 | Lee et al. | 250/338.1 |
| 5,688,699 A | 11/1997 | Cunningham et al. | |
| 6,097,031 A | 8/2000 | Cole | |
| 6,133,572 A | 10/2000 | Cunningham | |
| 6,222,454 B1 | 4/2001 | Harling et al. | 340/584 |
| 6,262,417 B1 | 7/2001 | Ju | |
| 6,303,934 B1 | 10/2001 | Daly et al. | 250/339.02 |
| 6,339,493 B1 | 1/2002 | Scalora et al. | 359/290 |
| 6,518,597 B1 | 2/2003 | Kim | |

(Continued)

FOREIGN PATENT DOCUMENTS

DE   43 34 578   10/1993

(Continued)

OTHER PUBLICATIONS

Talghader, J. U.S. Appl. No. 11/999,739, filed Dec. 6, 2007, entitled "Detection Beyond the Standard Radiation Noise Limit Using Reduced Emissivity and Optical Cavity Coupling".

(Continued)

*Primary Examiner* — David P Porta
*Assistant Examiner* — Yara B Green
(74) *Attorney, Agent, or Firm* — Kagan Binder, PLLC

(57) ABSTRACT

A cavity thermal detector assembly is presented that allows both tunable narrowband and broadband operation. This allows for high light efficiency, low thermal time constant, and flexibility in designing the optical path. The thermal detector/filter layers are part of the top mirror or mirrors of a Gires-Tournois-type optical cavity and provide absorption and reflection that can be adjusted to the desired width and position of the detected band. Tuning, if desired, can be achieved by applying micromechanical methods. Broadband operation may be achieved by bringing the sensor close to the bottom mirror. In this mode, the sensor or its supports may or may not touch over a small area.

34 Claims, 10 Drawing Sheets

U.S. PATENT DOCUMENTS

| | | |
|---|---|---|
| 6,534,977 B1 | 3/2003 | Duncan et al. |
| 6,573,504 B2 | 6/2003 | Iida et al. |
| 6,608,711 B2 | 8/2003 | Flanders et al. ............... 359/224 |
| 6,618,199 B2 | 9/2003 | Cook ............................ 359/578 |
| 6,667,479 B2 | 12/2003 | Ray |
| 6,791,736 B2 * | 9/2004 | Jain ............................... 359/261 |
| 6,806,470 B2 | 10/2004 | Iida et al. |
| 6,816,636 B2 | 11/2004 | Cole et al. ......................... 385/10 |
| 6,900,440 B2 | 5/2005 | Reed et al. |
| 7,002,697 B2 | 2/2006 | Domash et al. |
| 7,015,457 B2 | 3/2006 | Cole et al. ...................... 250/226 |
| 7,095,026 B2 | 8/2006 | Devitt et al. ................. 250/338.1 |
| 7,145,143 B2 | 12/2006 | Wood et al. ............... 250/339.04 |
| 7,196,790 B2 | 3/2007 | Cole .............................. 359/326 |
| 7,262,413 B2 | 8/2007 | Kauffman et al. |
| 7,460,246 B2 * | 12/2008 | Kothari .......................... 356/519 |
| 2002/0040967 A1 | 4/2002 | Oda |
| 2004/0089807 A1 | 5/2004 | Wada et al. |
| 2004/0200962 A1 * | 10/2004 | Ishikawa et al. ......... 250/339.04 |
| 2004/0202399 A1 * | 10/2004 | Kochergin et al. ............... 385/12 |
| 2004/0217264 A1 * | 11/2004 | Wood et al. ................ 250/214 R |
| 2004/0218509 A1 * | 11/2004 | Flanders et al. ............ 369/275.4 |
| 2005/0017177 A1 * | 1/2005 | Tai et al. ..................... 250/338.4 |
| 2005/0226281 A1 | 10/2005 | Faraone et al. |
| 2006/0039009 A1 | 2/2006 | Kiesel et al. |
| 2006/0077528 A1 * | 4/2006 | Floyd ............................ 359/291 |
| 2006/0091284 A1 | 5/2006 | Viens et al. |
| 2007/0215808 A1 | 9/2007 | Sekiguchi et al. |
| 2008/0035846 A1 | 2/2008 | Talghader et al. |
| 2009/0140144 A1 | 6/2009 | Myrick et al. |

FOREIGN PATENT DOCUMENTS

| | | | |
|---|---|---|---|
| DE | 43 34 578 | | 4/1995 |
| EP | 0 608 049 | | 6/1994 |
| GB | 2 231 713 | | 11/1990 |
| JP | 2005156255 | | 6/2005 |
| WO | WO 96/21140 | | 7/1996 |
| WO | WO 01/81879 | | 11/2001 |
| WO | WO 2004015783 | * | 2/2004 |
| WO | WO 2005/003704 | | 1/2005 |
| WO | WO 2005/022900 | | 3/2005 |

OTHER PUBLICATIONS

Li et al., "Thermal simulation of micromachines bridge and self-heating for uncooled $VO_2$ infrared microbolometer," Sensors and Actuators, 126 (2006) pp. 430-435.

Theocharous et al., "Detectors for Mid- and Far-infrared Spectrometry: Selection and Use," Instrumentation for Mid- and Far-infrared Spectroscopy, John Wiley & Sons Ltd., (2002), pp. 349-367.

"Micros Electro Mechanical Systems, An Investigation of micro Structures, Sensors, Actuators, Machines and Systems", Sponsored by the IEEE Robotics and Automation Society in cooperation with the ASME Dynamic Systems and Control Division, "Process and Design Considerations for Surface Micromachined Beams for a Tuneable Interferometer Array in Silicon", Aratani et al., 1993, pp. 230-235.

"IBM Technical Disclosure Bulletin", vol. 32 No. 8A, Jan. 1990, 4 pages.

International Search Report, PCT/US95/16505, Apr. 29, 1996; 3 pages.

1"Step-Wise Tunable Microbolometer Long-Wavelength Infrared Filter", Wang et al., Electrical and Computer Engineering, University of Minnesota, USA; 4 pages.

"Surface Micromachined tuneable interferometer array", Aratani et al., Sensors and Actuators A, 43 (1994) 17-23, pp. 17-23.

"Design of Infrared Wavelength-Selective Microbolometers Using Planar Multimode Detectors", Neikirk et al.; Microelectronics Research Center, The University of Texas at Austin; SPIE's Microtechnologies for the New Millennium, May 15-18, 2003; pp. 1-16.

Y. Wang, B. Potter, M. Sutton, R. Supino and J. Talghader, "Step-wise Tunable Microbolometer Long-wavelength Infrared Filter," 2005 Transducers Conference Digest of Technical Papers, Seoul, Korea, Jun. 2005, pp. 1006-1009.

A.S. Weling et al., "Antenna-coupled microbolometers for multi-spectral infrared imaging," Proceedings of the SPIE, vol. 6206, pp. 62061F-1 to 62061F-8, 2006.

S. Han et al., "Multilayer fabry-perot microbolometers for infrared wavelength selective detectors," Proceedings of the SPIE, vol. 6206, pp. 62061G-1 to 62061G-7, 2006.

V.N. Leonov et al., "Two-color thermal detector with thermal chopping for infrared focal plane arrays," Applied Optics, vol. 40, No. 16, 2001.

M. Almasri et al., "Amorphous silicon two-color microbolometer for uncooled IR detection," IEEE Sensors Journal, vol. 6, No. 2, pp. 293-300, 2006.

Talghader, U.S. Appl. No. 11/999,739, filed Dec. 6, 2007.

* cited by examiner

TUNABLE FINESSE INFRARED CAVITY THERMAL DETECTORS

CROSS-REFERENCE TO RELATED APPLICATION

The present application is based on and claims the benefit of U.S. provisional patent application Ser. No. 60/802,751, filed May 23, 2006, the content of which is hereby incorporated by reference in its entirety.

GOVERNMENT RIGHTS

The United States government has certain rights in this invention pursuant to Army Research Office Grant No. DAAD19-03-1-0343.

BACKGROUND OF THE INVENTION

The present invention relates to thermal detectors. More specifically, the present invention relates to tunable thermal detectors.

In recent decades, there has extensive work in the area of micromechanical filters and detectors. Most of these have been developed for the telecommunications industry. Common examples are vertical-cavity detectors, tunable vertical-cavity detectors, resonant-cavity enhanced photodetectors, and tunable resonant-cavity enhanced photodetectors. Less common are devices that use these concepts for longer wavelength applications. For example, an adaptation of telecommunications technology using a filter and semiconductor detector for the SWIR, MWIR, and LWIR has been given by Faraone, et. al., U.S. Patent Application Publication No. 2005/0226281, published Oct. 13, 2005 and entitled TUNABLE CAVITY RESONATOR AND METHOD OF FABRICATING SAME.

For thermal detection, filters must ultimately couple light into an absorption layer located somewhere in the system so that heat may be generated and detected by some means, such as by a microbolometers, golay cell, pyroelectric detector, etc. In these longer wavelength regions, there are significant applications for filters and detectors that can see only two or three broad bands. These devices are often called "two-color" or three-color" and they are often used for target identification and temperature measurement. Neikirk (see, A. S. Weling, P. F. Henning, D. P. Neikirk, and S. Han, "Antenna-coupled microbolometers for multispectral infrared imaging" Proceedings of the SPIE, vol. 6206, pp. 62061F-1 to 62061F-8, 2006; and S. Han, J.-Y. Jung, and D. P. Neikirk, "Multilayer fabry-perot Microbolometers for infrared wavelength selective detectors," Proceedings of the SPIE, vol. 6206, pp. 62061G-1 to 62061G-7, 2006) and Butler (see, V. N. Leonov and D. P. Butler, "Two-color thermal detector with thermal chopping for infrared focal plane arrays," Applied Optics, vol. 40, no. 16, 2001; and M. Almasri, B. Xu, and J. Castracane, "Amorphous silicon two-color microbolometer for uncooled IR detection," IEEE Sensors Journal, Vol. 6, no. 2, pp. 293-300, 2006) have both proposed absorptive filters and electrostatically actuated thermal detectors that can perform such tasks. For narrower bands such as those used for performing denser multispectral target identification and detecting spectral signatures, as shown in Cole, et. al. U.S. Pat. No. 5,286,976, issued Feb. 15, 1994 and entitled MICROSTRUCTURE DESIGN FOR HIGH IR SENSITIVITY; U.S. Pat. No. 5,550,373, issued Aug. 27, 1996, and entitled FABRY-PEROT MICRO FILTER-DETECTOR; U.S. Pat. No. 6,816,636, issued Nov. 9, 2004, and entitled TUNABLE OPTICAL FILTER; U.S. Pat. No. 7,015,457, issued Mar. 21, 2006, and entitled SPECTRALLY TUNABLE DETECTOR; and U.S. Pat. No. 7,196,790, issued Mar. 27, 2007 and entitled MULTIPLE WAVELENGTH SPECTROMETER have proposed a tunable transmissive filter placed external to an absorbing thermal detector. The Cole et al. patents describe both electrostatic and piezoelectric actuation methods for such a device. Koskinen, U.S. Pat. No. 5,589,689, issued Dec. 31, 1996 and entitled INFRARED DETECTOR WITH FABRY-PEROT INTERFEROMETER has developed similar devices except that his absorption layer is on one of the mirrors and may boost the reflectivity of that mirror. Tai, et. al. U.S. Publication No. 2005/0017177, published Jan. 27, 2005 and entitled APPARATUS AND METHOD FOR SENSING ELECTROMAGNETIC RADIATION USING A TUNABLE DEVICE have modified this basic structure to use an absorption filter, as Neikirk has proposed for broadband filters, with a separate detector integrated on top.

SUMMARY OF THE INVENTION

A thermal detector configured to detect infrared radiation, includes a first mirror, a second mirror. The first and second mirrors define a cavity therebetween. The second mirror has a first side which is external to the cavity and a second side which is positioned closer to the cavity than the first said. A thermal sensor is coupled to the second mirror which is partially absorbing to the infrared radiation and positioned within the cavity including within the second mirror or coincident with either side of the second mirror.

BRIEF DESCRIPTION OF THE DRAWINGS

FIG. 1A represents the raw emissivity of the substances, and FIG. 1B shows the difference in power between the substance and a blackbody that the detector would see.

FIG. 2A represents the raw emissivity of aluminum oxide, and FIG. 2B shows the difference in power between the substance and a blackbody that the detector would see.

FIG. 3A represents the raw emissivity of grass, and FIG. 3B shows the difference in power between the substance and a blackbody that the detector would see.

DETAILED DESCRIPTION OF ILLUSTRATIVE EMBODIMENTS

The present invention relates to a thermal detector that has the ability to tune in the narrowband but may also switch to a broadband mode. If used in an array, the design allows the spectral response of a focal plane array to be tuned on a pixel-by-pixel basis. A top plate of the cavity is actuated to change its height above a reflective substrate, thereby controlling the spectral frequency of a relatively narrow resonance. Broadband performance is achieved by actuating the plate near or to the substrate, thereby eliminating reflections from the air gap. This structure is also effective at tuning the responsivity of a pixel because of the ability to filter out unneeded portions of the spectrum.

Figure 4:
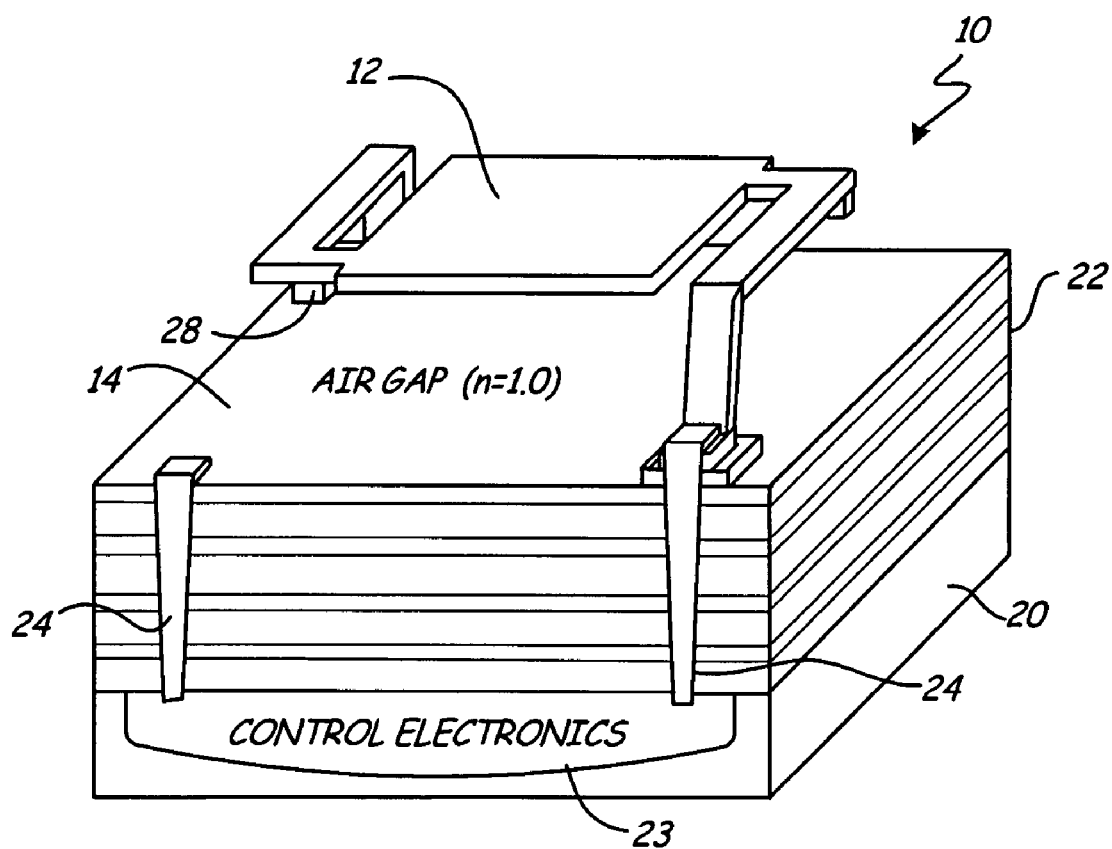
FIG. 4 is a cross sectional view of a spectrally tunable bolometer pixel in accordance with one embodiment of the present invention. The bolometer is built as part of an optical cavity design to couple light into the microbolometer plate. The bolometer plate is composed of a reflector, a structural layer(s), a thin absorber(s) and partially absorbing detector(s). Some of these layers may be combined. Broadband detection can be implemented by actuating the bolometer plate to very near the bottom mirror (held aloft by micromachined projections in the bolometer supports).

Turning first to FIG. 4, a cross sectional view of a spectrally tunable bolometer pixel in accordance with one embodiment of the present invention is shown. The bolometer is fabricated as part of an optical cavity design to couple light into the microbolometer plate. The bolometer plate is composed of a reflector, a structural layer(s), a thin absorber(s) and a partially absorbing detector(s). Some of these layers may be combined. Broadband detection can be implemented by actuating the bolometer plate to a position very near the bottom mirror (held aloft by micromachined projections in the bolometer supports). More specifically, a thermal detector assembly 10, using a bolometer as an example, is shown in FIG. 4. The sensor 12 is part of the mirror structure and is an integral contributor to the reflectivity and absorption of the device rather than a separate component. This architecture has several advantages listed below in comparison to other configurations. The cavity 14 is configured to couple light into the detector plate 12, which otherwise has only a moderate single-pass absorption. The device 10 of FIG. 4 is fabricated on a silicon or other substrate 20 which carries a layered stack 22 having a desired optical characteristic to form the Fabry-Perot cavity. Control electronics 23 may be provided for controlling the gap of the cavity 14. Mictroelectronics 22 couple to metal vias 24 which are used to adjust the spacing of the gap 14. FIG. 4 also illustrates a thermal stand-off 28 which can be used to prevent the microbolometer 12 from contacting the stacked layers 22. FIG. 4 is a simplified cross-sectional perspective view of the present invention. In general, as used herein, elements 12 and 22 may be referred to as "mirrors" with the microbolometer detector being a part, or otherwise integral with at least one of the mirrors. In some configurations, it may be desirable to use multiple detectors across a single mirror.

As will become apparent through the discussion herein, advantages of the present invention include:

1) Broadband Capability: One possible operational mode of the focal plane array is a broadband mode covering the thermal Long Wave Infrared (LWIR) other IR wavelengths such as MWIR are possible. This allows the device to image with full optical sensitivity until an area or target of potential interest is selected. The broadband absorption is highly efficient and can have more than 75% of the spectral response of a state-of-the-art microbolometer.

2) Versatile Narrowband Capabilities: The detector layer structure can be redesigned for a variety of narrowband spectral widths depending on the spectral resolution/sensitivity desired.

3) Wide Spectrum: The spectral range of the detector is only limited by the reflectivity bandwidth of the bottom mirror, and therefore, depending on the choice of materials, can potentially tune across the full LWIR 8-14 µm range or other range such as the MWIR (3-5 µm).

4) High Light Efficiency: One of several advantages that the integrated pixel approach has over a detector outside of a Fabry-Perot cavity is an optimal use of optical energy. No obstructing devices lie between the imaging optics and the detector element, which means that the array fill-factor is high and little light is lost to reflection at intermediate surfaces.

5) Robust Optical Design: The integrated pixel design also does not require any critical alignments during packaging. This a real danger in separate filter designs, which require micron-accuracy optical alignments in the x, y, and z directions. The design is also compatible with low f/# (focusing strength) optics because it does not have intermediate filters that force an aperture on the detector that is smaller than the pixel size.

6) Topside Light Incidence: A characteristic of many cavity-based thermal detector structures that have a detector that is on top of a mirror rather than embedded as an optical layer is that the detector blocks light and therefore it is often placed behind the actual optical cavity. This feature makes packaging simpler since the unprocessed side of the wafer attaches to the bottom of the chip package, as is standard in the IC industry.

Figure 1A:
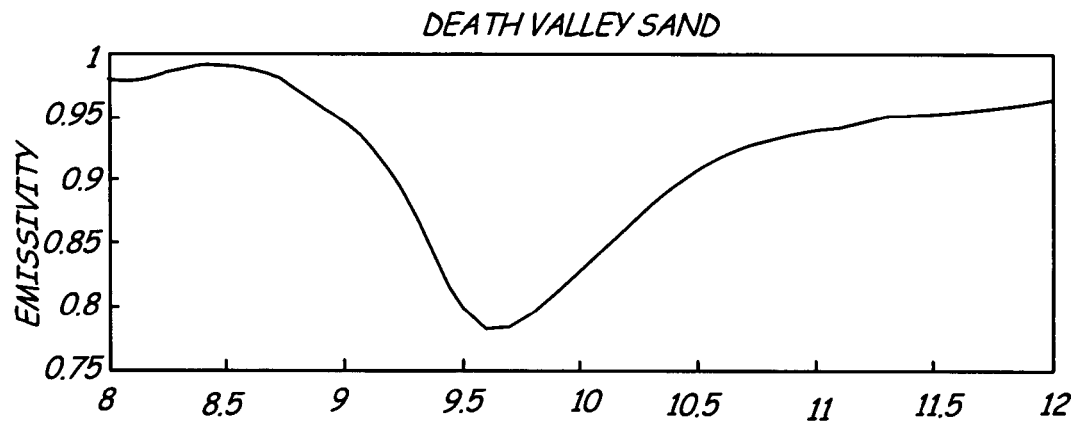
FIGS. 1A and 1B are emissivity spectrum of Death Valley sand.
Figure 1B:
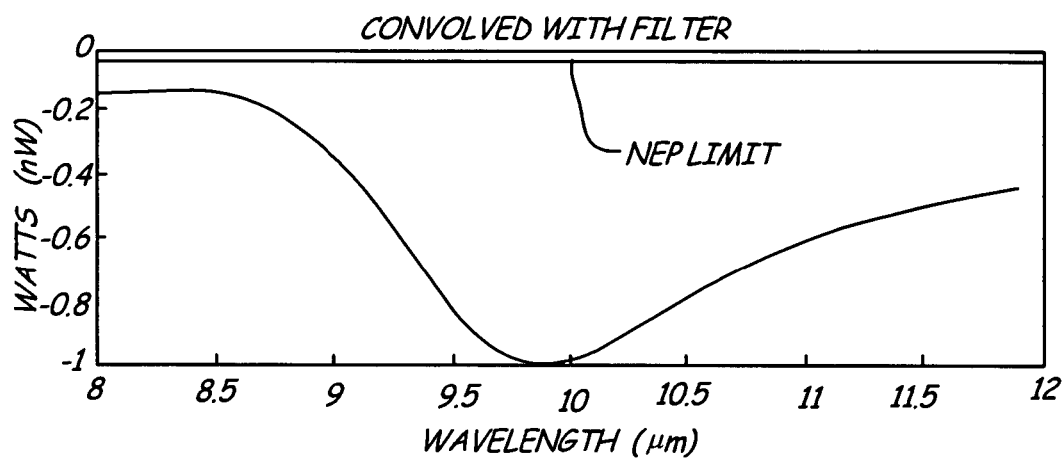

Referring back to FIGS. 1A and 1B, emissivity spectrum of Death Valley sand are shown. FIG. 1A represents the top graph in these figures represents the raw emissivity of the substances, and FIG. 1B shows the difference in power between the substance and a blackbody that the detector would see.

Figure 2A:
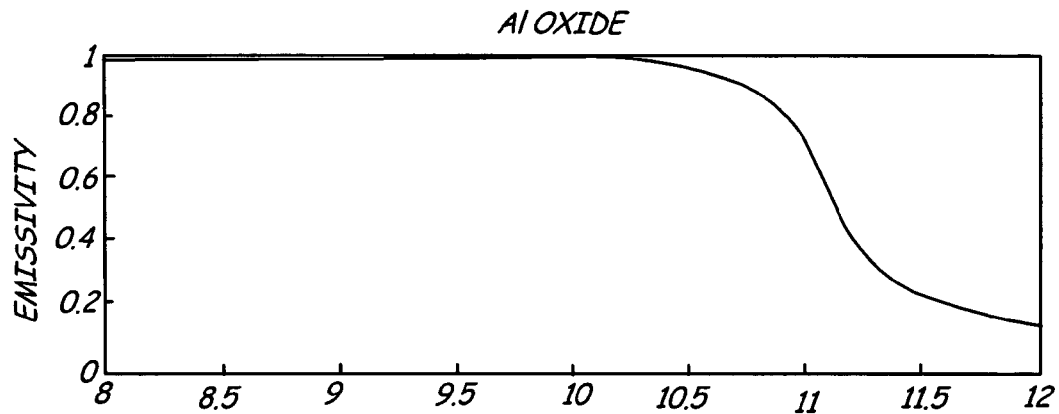
FIGS. 2A and 2B are emissivity spectrum of aluminum oxide.
Figure 2B:
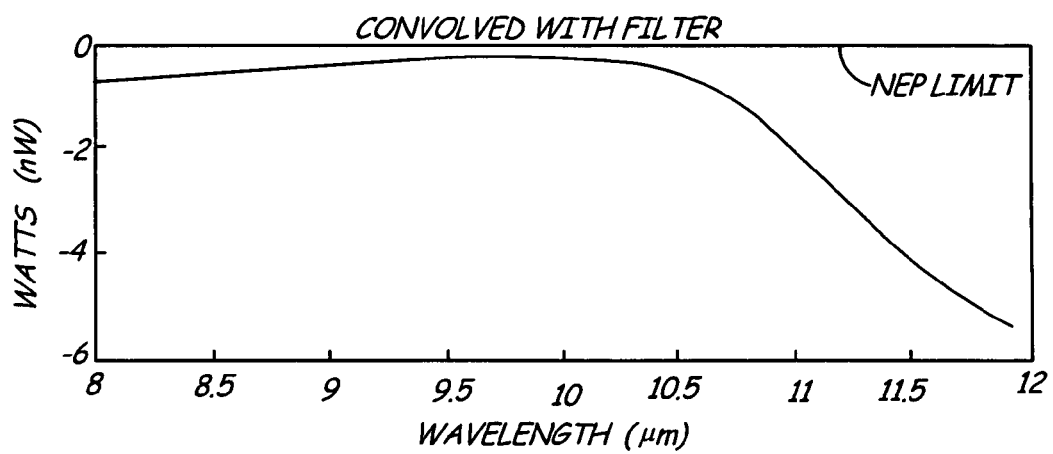

FIGS. 2A and 2B an emissivity spectrum of aluminum oxide. FIG. 2A represents the raw emissivity of aluminum oxide, and FIG. 2B shows the difference in power between the substance and a blackbody that the detector would see.

Figure 3A:
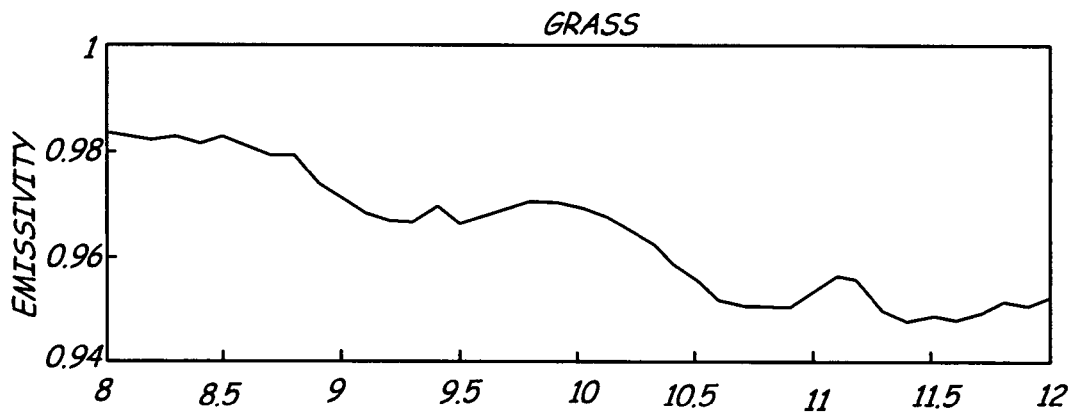
FIGS. 3A and 3B are emissivity spectrum of grass.
Figure 3B:
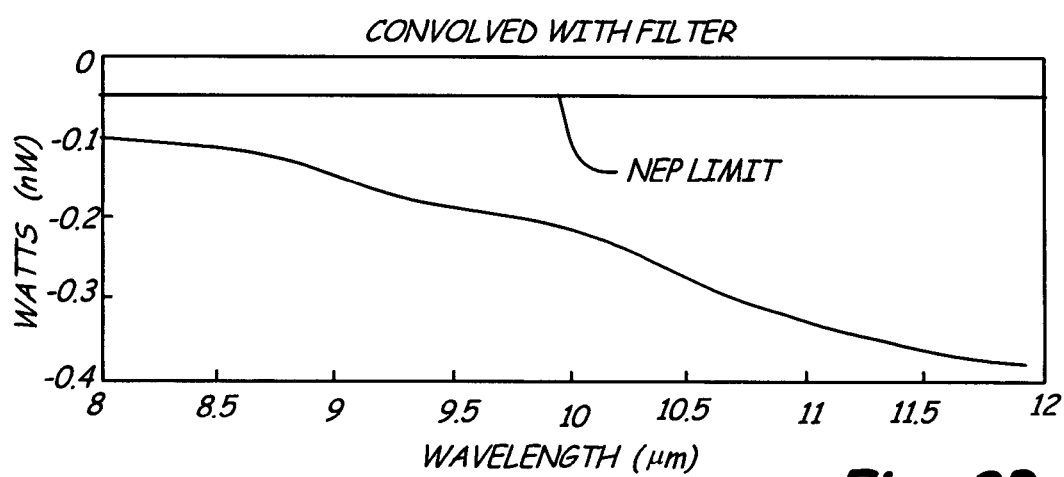

FIGS. 3A and 3B are emissivity spectrum of grass. FIG. 3A represents the raw emissivity of grass, and FIG. 3B shows the difference in power between the substance and a blackbody that the detector would see.

FIG. 4 is a cross sectional view of a spectrally tunable bolometer pixel in accordance with one embodiment of the present invention. The bolometer is built as part of an optical cavity design to couple light into the microbolometer plate. The bolometer plate is composed of a reflector, a structural layer(s), a thin absorber(s) and partially absorbing detector(s). Some of these layers may be combined. Broadband detection can be implemented by actuating the bolometer plate to very near the bottom mirror (held aloft by micromachined projections in the bolometer supports).

Figure 5:
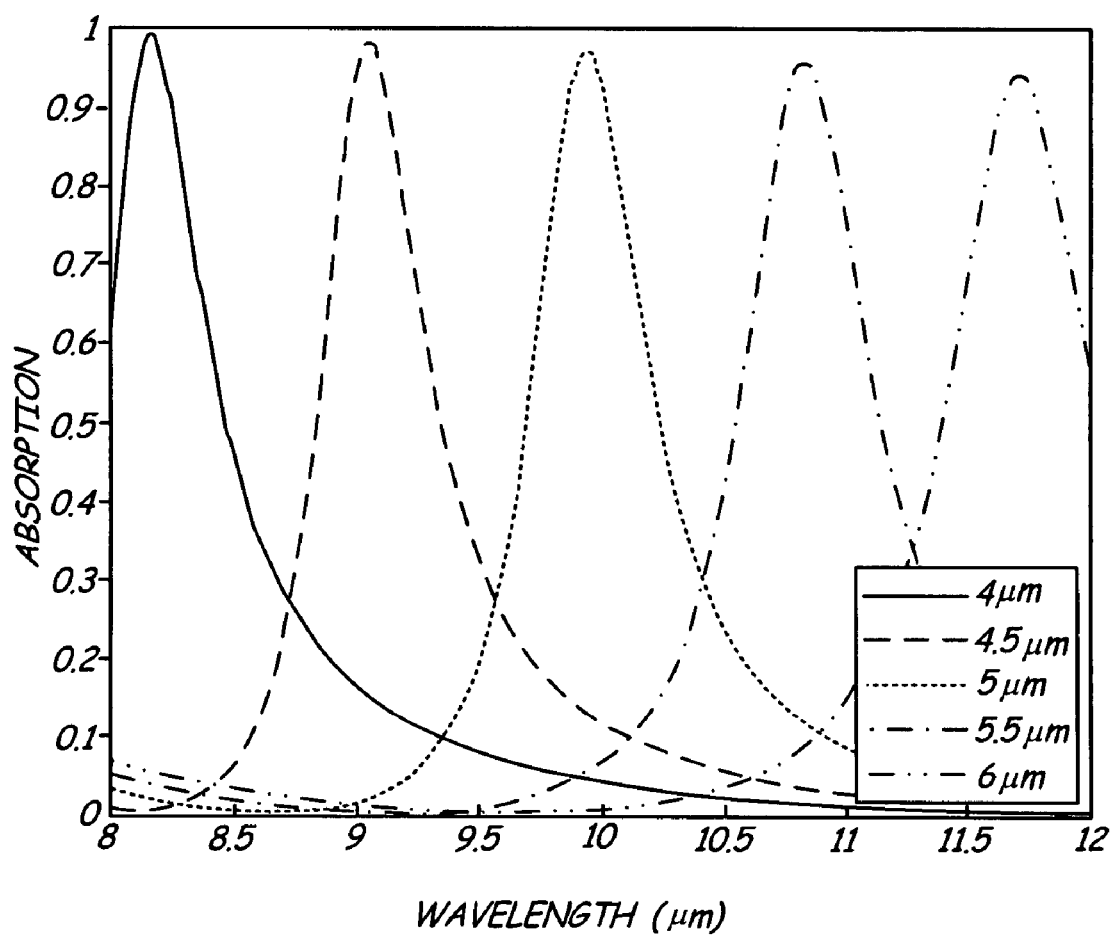
FIG. 5 is the absorption spectrum for a simulated integrated pixel tunable microbolometer. The device has a tuning range which almost completely covers the 8-14 μm range. The numbers in the legend refer to the height of the gap spacing during narrowband tuning.
Figure 6:
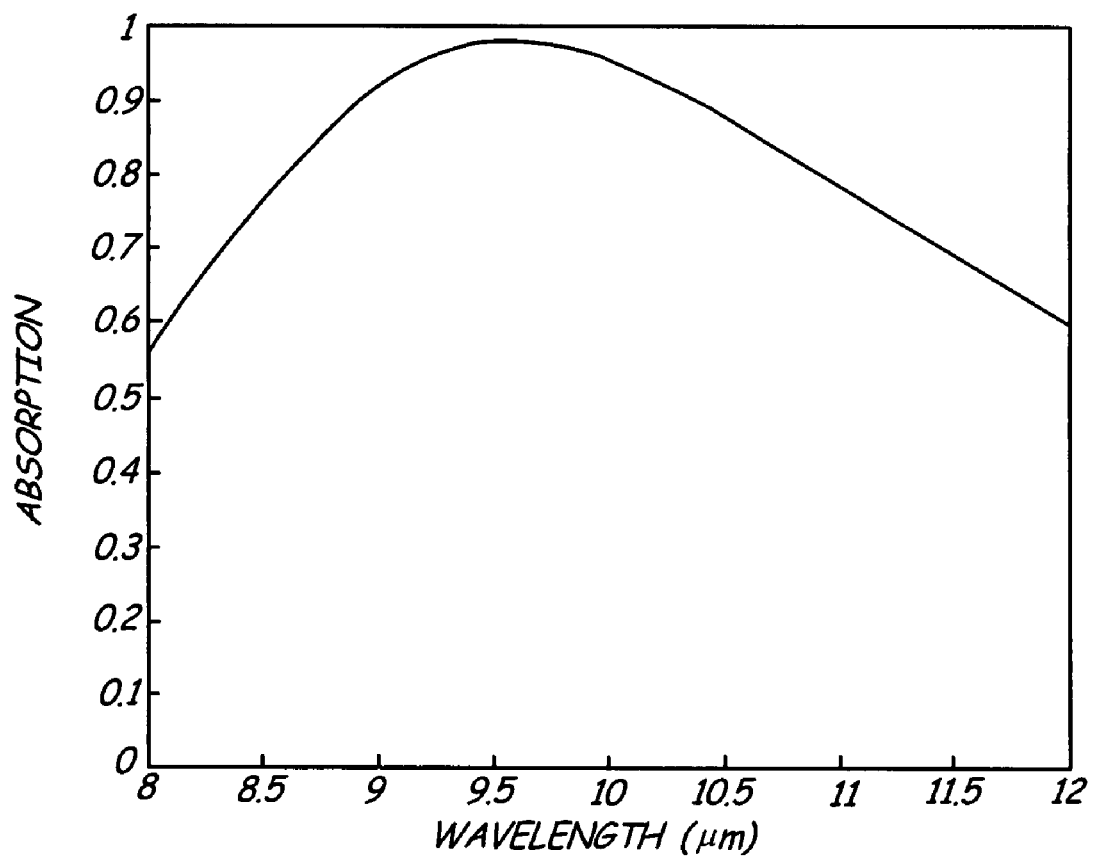
FIG. 6 is the absorption spectrum for an integrated pixel tunable microbolometer operating in broadband mode. The broadband performance over the 8-12 micron range almost meets that of a standard microbolometer which typically averages about 85% over this range.

To examine the spectral capabilities of these designs, several transmission matrix simulations were performed. FIG. 5 shows the absorption spectrum of an integrated pixel device. FIG. 6 shows the broadband performance of the device when the structure is actuated to a position proximate the bottom mirror. When switched to broadband mode, the device will either have no gap or a small gap between the top mirror and bottom mirror. (As used herein, "small" means on the order of $\lambda/10$ or less, where $\lambda$ is the center filter wavelength.) Note that in one example, if the resonance were $\frac{3}{2}$ wave instead of $\frac{1}{2}$ wave then the gap could be on the order of a wave. If a gap is desired between the mirrors in broadband mode, such as to reduce stiction, a thermal standoff or standoffs may be placed on the supports or detector plate. The contact through thermal standoffs does not necessarily imply a significantly increased thermal conductance and thereby a reduced sensitivity. Studies such as that by Song and Talghader (see, W. B. Song and J. J. Talghader, "Microbolometers with Adaptive Detectivity using Electrostatic Actuation", *Technical Digest of* 2004 *Solid-State Sensors, Actuators and Microsystems Workshop*, Hilton Head, 2004, pp. 336-339) show that the thermal conductance across an interface is finite. Therefore standoffs with a small contact area and/or low contact pressure may have a thermal conductance that is actually lower than that of the supports or other thermal paths.

FIG. 5 is the absorption spectrum for a simulated integrated pixel tunable microbolometer. The device has a tuning range which almost completely covers the 8-14 μm range. The numbers in the legend refer to the height of the gap spacing during narrowband tuning. The structure of FIG. 5 is as following:

TABLE 1

Simulation results for separate detector and absorber Cr absorber layer

| Material | Thickness | n | k |
|---|---|---|---|
| Air | | 1 | |
| Cr | 1.5 nm | 11.8 | 29.08 |
| SrF$_2$ | 80 nm | 1.3 | 0 |
| Ge | 600 nm | 4 | 0 |
| Doped Ge | 20 nm | 4 | 0.004 |
| Air Gap (4 μm to 6 μm) for narrowband and 10 nm for broadband | | | |
| Au | 200 nm | 12.24 | 54.7 |
| Cr | 40 nm | 11.8 | 29.8 |
| Si | Substrate | 3.4 | 0 |

1. All n and k values are assumed to be at 10 μm. These parameters do not change too much over 8-12 μm.
2. Value of k for doped Ge (n type $10^{18}$ cm$^{-3}$) from Fan et. al., Phys. Rev., 101, 566 (1956)

FIG. 6 is the absorption spectrum for an integrated pixel tunable microbolometer operating in broadband mode. The broadband performance over the 8-12 micron range almost meets that of a standard microbolometer which typically averages about 85% over this range.

Figure 7A:
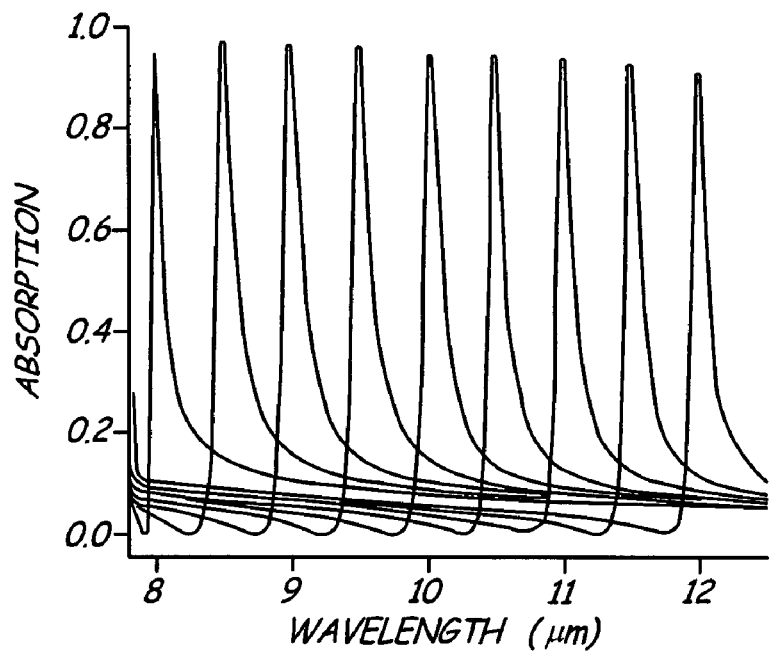
FIGS. 7A and 7B show the tunable thermal detector absorption spectrum in a narrow band mode (7A) and a broadband mode (7B). The spectrum in (7A) is designed for higher spectral resolution than that shown in FIG. 5, while the broadband is designed to be narrower than that shown in FIG. 6.
Figure 7B:
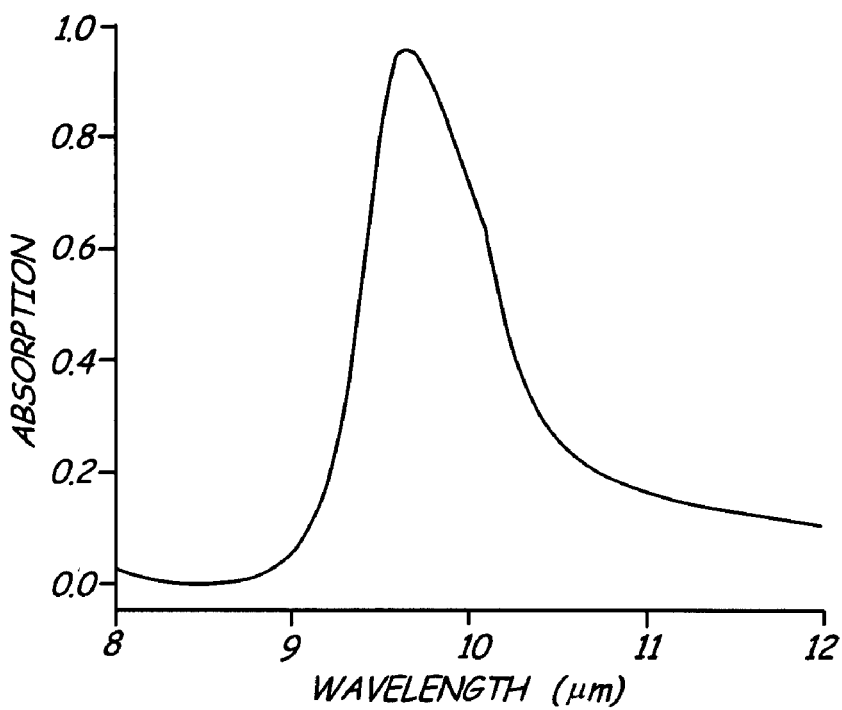

Further as illustrated in FIGS. 7A and 7B, the broadband mode may not necessarily be designed to cover the full spectral range of the device, but rather just expand the spectral width of the resonance relative to the narrowband mode.

FIG. 7A is the absorption spectrum for a simulated integrated pixel tunable microbolometer. The device has a tuning range which almost completely covers the 8-14 μm range. The numbers in the legend refer to the height of the gap spacing during narrowband tuning.

FIG. 7B is the absorption spectrum for an integrated pixel tunable microbolometer operating in broadband mode. The broadband performance over the 8-12 micron range almost meets that of a standard microbolometer which typically averages about 85% over this range.

As any tunable uncooled array will receive light from the same target, the spectrum that it receives must be a significant fraction of the LWIR band (or MWIR, etc.) or its sensitivity will suffer. Consider a thermal detector, such as a microbolometers, with an NETD=0.04K for absorption in the 8-14 μm range. As the absorption spectrum is reduced the NETD will increase. This increase can be roughly quantified by noting that in the Johnson noise limit, the NETD is inversely proportional to $dL/dT_t$, the change in target radiance per unit temperature. As $dL/dT_t$ remains constant to within about 40% over the 8-14 μm band, it can be approximated that the response of the bolometer is substantially flat over this range. Thus if the absorption band is reduced from its total width of $\Delta\lambda$~6 μm to a width of $\Delta\lambda$~1 μm, the NETD will increase from 0.04K to about 0.24K. This is still a reasonable value, but if a narrowband filter with a finesse of 100 is used to block most of the spectrum, then $\Delta\lambda$~0.1 μm and NETD~2.4K, which is a much less useful value for imaging. However, higher finesse systems may be useful for the detection of chemical or biological agents, where an active source can be used in place of background radiation. If a tunable thermal detector with a relatively broad resonance (say a FWHM=750 nm in the LWIR) were used to examine the spectrum of a few substances in the LWIR, the data in FIGS. 1A and 1B, 2A and 2B, and 3A and 3B would be obtained, respectively. The substances tested are: sand, aluminum oxide (a common component of rocks), and grass. The top graph (A) in these figures represents the raw emissivity of the substances, and the bottom graphs (B) represent the difference in power between the substance and a blackbody (zero line) that the detector would see. In these curves it is seen that an uncooled device with a conservative NETD can be filtered and still detect emission changes across the LWIR. Even a substance such as grass that is normally assumed to emit like a blackbody shows noticeable changes in the LWIR.

Figure 8:
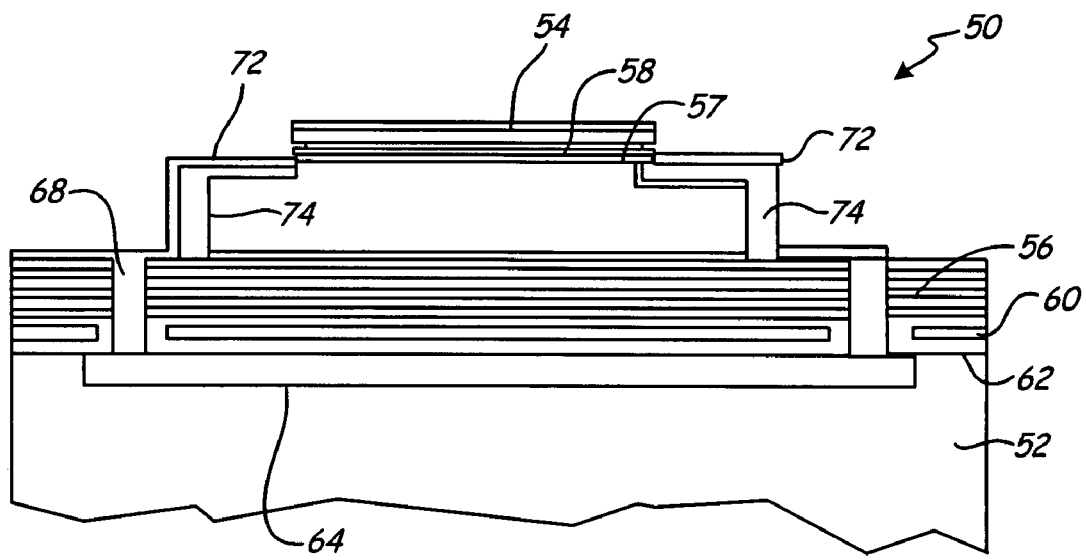
FIG. 8 is a side cross-sectional view of a thermal detector in accordance with one example embodiment of the present invention.
Figure 9:
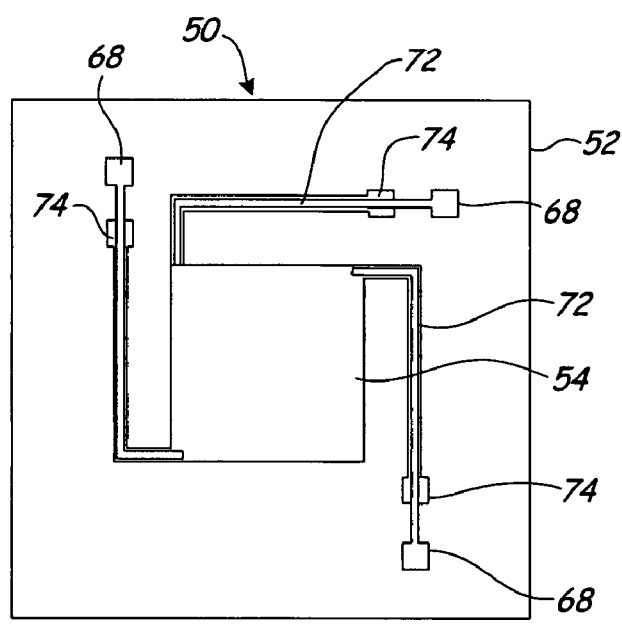
FIG. 9 is a top plan view of the thermal detector of FIG. 8.

FIGS. 8 and 9 above are a cross-section and top view of an example device, respectively. They assume a microbolometer detector, but other detector types can be used with only small changes to the architecture. FIGS. 8 and 9 show a thermal detector assembly 50 carried on a substrate 52. Thermal detector assembly 50 includes a top mirror assembly or stack 54 and a bottom mirror assembly or stack 56. The top mirror stack 54 includes an absorber 57 and a detector or sensor 58 such as a microbolometer detector. The bottom mirror stack 56 comprises a plurality of layers of metal and dielectric. The lower metal layer 60 is separated from the substrate by an insulator 62. Control electronics 64 are also carried on the substrate 52 and are use to control operation of the detector 50. Electrical contacts 68 are used to electrically couple the control electronics to the detector 58 through metal contact lines 72 carried on support posts 74. The embodiments are not meant to be the only possible embodiment and changes can be made as desired. The terms "bottom" and "top" as used herein are merely used for describing the figure and do not imply any preferred direction relative to gravity. In one preferred embodiment, the device uses light incident from the direction of the top mirror as this allows for simple packaging and is a highly efficient configuration that cannot be easily used in alternative technologies such a that of Koskinen, or Tai. In the embodiment of FIGS. 8 and 9, the bottom mirror is composed of a dielectric quarter wave stack plus metal layer for high reflectivity. Usually, the optimal operation occurs when the bottom mirror is 100% reflective, but so long as the bottom mirror's combined transmission and absorption is small, the device is still efficient. Alternative embodiments includes a bottom mirror made solely of dielectric layers (which might include one or more air/vacuum layers) or only metal. In the metal-only case, the bottom mirror will absorb a certain amount of light and one must take care that this does not significantly detract from the on-resonance absorption of the top mirror.

In some configurations, control electronics are included with the device. If control electronics are positioned below the device, an electrically conductive via can be opened through the mirror to the electronics. Alternatively, the bottom mirror can be patterned to have a finite lateral extent so that the conducting leads run over the edge of the mirror and connect to any possible electronics outside the mirror. A support structure, such as a post, supports the top mirror. The post may or may not be coincident with the via, but electrically conducting lines, for example to tune or read-out the device, can be configured to follow the support. The support may be fabricated of a very low thermal conductivity material or materials while the electrically conductive lines may be made of a semiconductor or metal that has a high ratio of electrical to thermal conductivity. In practice, the support and via material may be the same.

Figure 10:
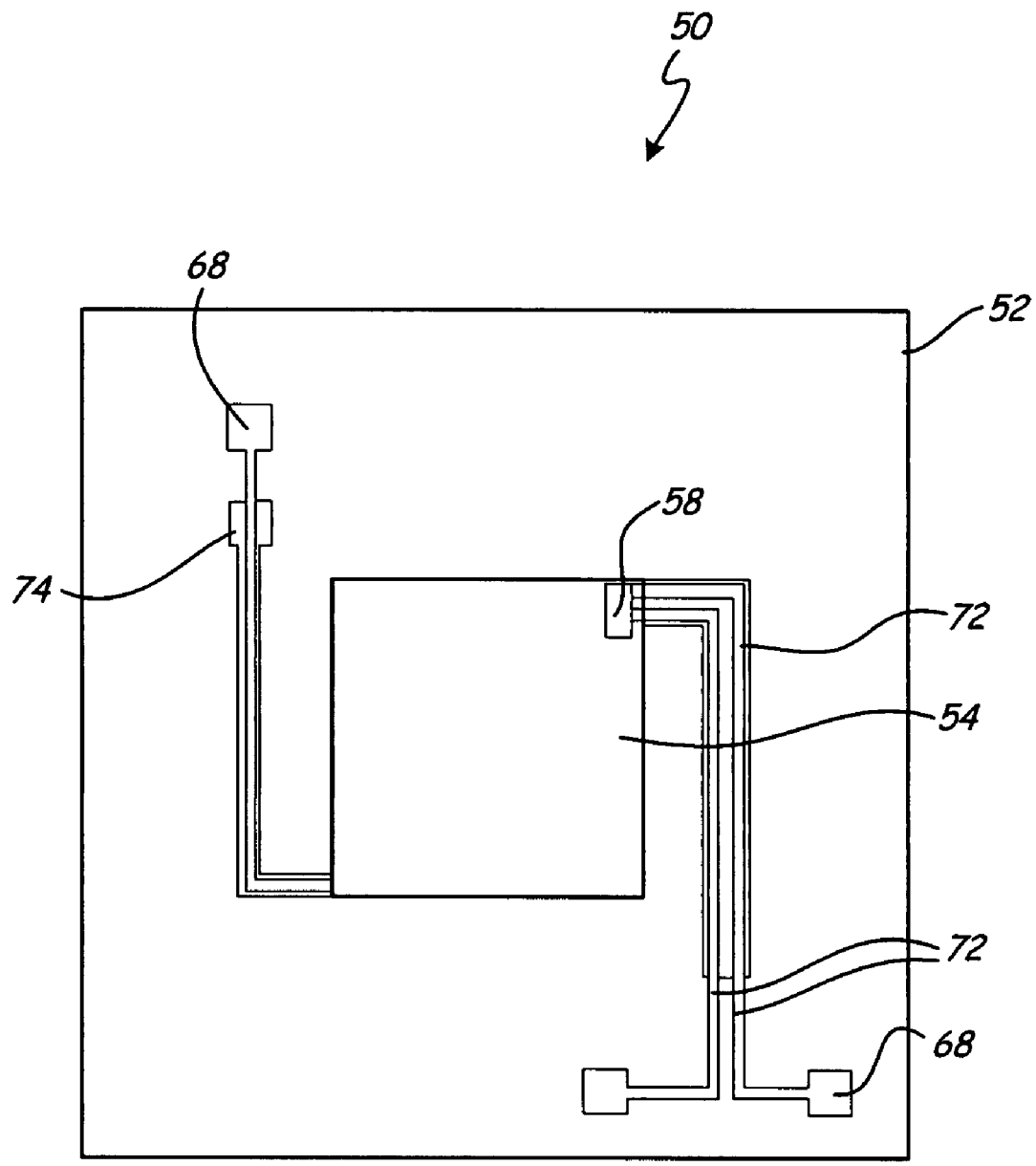
FIG. 10 is another example top plan view of a thermal detector.

During fabrication (one possible fabrication sequence is described later), a sacrificial material exists between the top and bottom mirrors. Near the end of fabrication, that material is removed. The top mirror may include structural layer(s), reflector layer(s), absorber layer(s), and detector layer(s). Some or all of these functions may be combined in a single layer (for example to reduce thermal mass for higher speed). One of the components that allows light incident through the top mirror and overall high light and mass efficiency is the fact that the detector is partially transmissive. This is different from typical prior structures designed for tunable thermal detection. This means that light passes through the detector and absorber, but the overall absorption per pass of the top mirror structure is related to the reflectivity. The higher the reflectivity of the top mirror, the lower the optimal absorption of the top mirror. Proper optical design may lead to near 100% coupling of light into the detector or other parts of the connected top mirror mass at the resonant wavelength. Other nearby wavelengths are rejected from the cavity. The device can switch from narrowband tuning to a fixed broadband by actuating the top mirror to move near the substrate or contact the substrate. The top mirror is not required to contact the substrate for many actuation modes, such as a piezoelectric bimorph or certain side-electrode electrostatic techniques, but for a standard DC parallel-plate electrostatic actuator, there should need to be small projections from the bottom of the supports or top mirror to prevent contact over a large area. In one preferred embodiment, the area of and pressure applied to these projections is small enough so that they do not significantly impact the thermal conductance and sensitivity of the device. The idea of using absorption to couple resonant light into a cavity has existed but the detector has been a parasitic part of the optical path and resonant thermal detectors have positioned the detector (i.e., Tai and Koskinen) outside this path. In addition, these devices are not configured to have capability for broadband operation. Broadband operation is useful which is critical in low-light applications where a large signal-to-noise ratio is needed to identify an object or region of interest prior to spectral analysis. Note that the reflector of the top mirror can comprise air (vacuum), dielectric(s) and/or metal(s), or other materials. For example, the detector/absorber layer(s) could be separated from reflector layers by a vacuum gap. An alternative, and optically slightly less efficient embodiment, that removes the detector from the optical path is shown in FIG. 10. FIG. 10 shows an example embodiment of thermal detector assembly 50 in which the sensor 58 is moved from the optical path. Elements in FIG. 10 which are similar to elements in FIGS. 8 and 9 have retained their numbering. In this configuration, the sensor 58 is placed on or near the edge of the support 72 and is sufficiently small such that it does not absorb or diffract light in a significant way.

Figure 11:
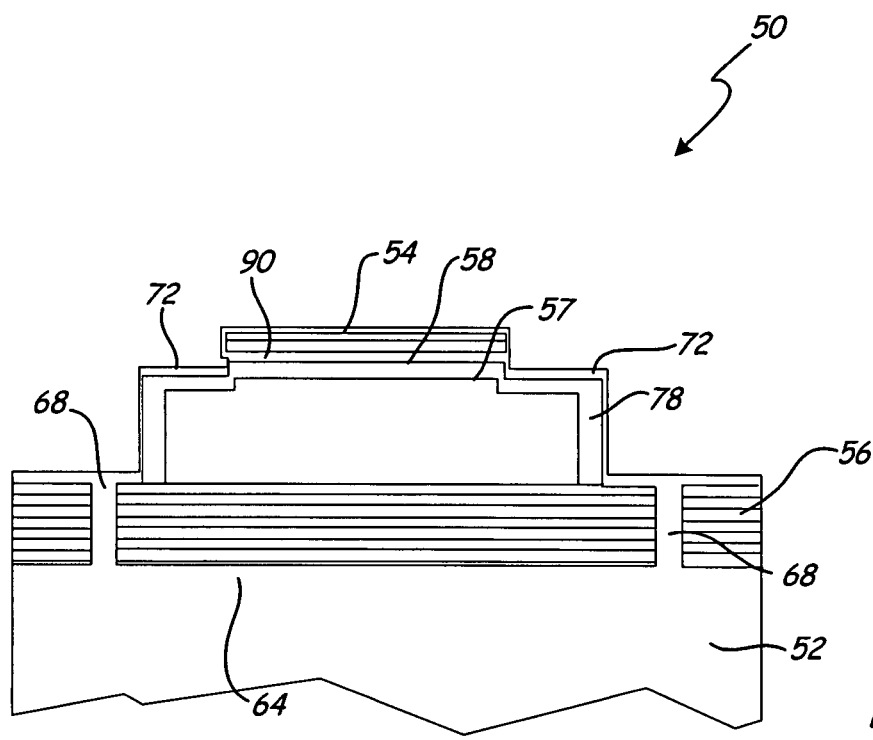
FIG. 11 is a side cross-sectional view of a thermal detector including an air gap in a top mirror stack.

Another alternative embodiment where one of the reflector layers of the top mirror is air/vacuum is shown in FIG. 11. In the embodiment of FIG. 11, elements which are similar to elements in FIGS. 8 and 9 have retained their numbering. In the configuration of FIG. 11, the top mirror stack 54 includes an air gap 90 which may comprise air, gas, vacuum, etc. Reference numeral 78 identifies support structure (see reference numeral 74 of FIG. 8 and the description thereof).

If a tunable structure is desired, the tuning can be accomplished using any method compatible with parallel plate micromachined devices. Examples are bimorph actuation in the supports using thermal or piezoelectric bimorphs with appropriate applied currents or voltages, respectively. Other possibilities include magnetic actuation where a magnetic layer positioned to the side of the top mirror (or very thin across it) or on the supports can be used with, for example, an external magnetic field or integrated coil. The preferred actuation for this embodiment is electrostatic since it is easily integrated with MEMS parallel-plate devices. Often, but not necessarily, the absorber layer can double as an actuation electrode. The electrodes can extend fully or partially across the bottom and top mirrors or be primarily to the sides and between the supports. The bottom mirror electrode can be underneath the mirror, be a layer in the mirror (e.g. a doped Ge top layer) or a conductor outside the main optical path.

In the top view of FIG. 9, two supports are used to connect electrodes to the detector, which may be, for example, a temperature sensitive resistor making the device a bolometer. A third support is used to contact the actuation electrode which can comprise, for example, absorber 57 or another layer. Alternate embodiments may have a different number of supports. For example, a detector may be positioned on or near one support structure which may have two or more wires vertically stacked (with intervening insulator/air/vacuum) or laterally placed. It is also possible that a single layer in the top mirror may act as both actuator and detector. This may be accomplished, for example, by having a voltage applied to the top mirror to actuate the device to a desired resonant wavelength. Then, for example, a short voltage pulse may be superimposed on the steady voltage that has a shorter duration than the mechanical response time and/or thermal integrating time such that the device can be read without moving the plate enough during the integration time to significantly degrade performance.

FIG. 10 shows a top view with two supports and an unobtrusive detector 58. One of the supports shows a lateral configuration for contacting the detector. Alternatively, there may be only one contact line per support and the actuation and detection can be combined using the pulsed read technique described above.

Figure 12:
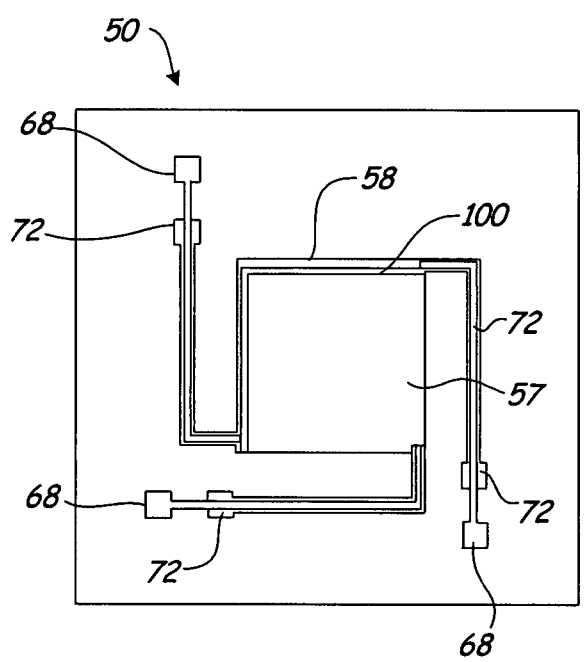
FIG. 12 a top plan view of a thermal detector in which a detector and actuator or absorber are carried on the same layer of a top mirror.

FIG. 12 shows a top plan view of an alternative embodiment where the detector 58 and absorber 57 are part of the same optical layer, but have been electrically separated by an insulator 100. In FIG. 12, similar elements which are similar to elements shown in FIGS. 8 and 9 have retained their numbering. This minimizes optical disruptions that can occur if the detector is not explicitly considered an optical element. Note that more complex patterns may be introduced into the detector/absorber to introduce, for example, a diffractive element such as a grating or Fresnel lens. Such elements could perform, for example, polarization selection, further spectral selection, focusing, or wavefront shaping.

The fabrication of the present invention may be in accordance with any appropriate technique. For example, standard micromachining techniques may be employed. There are many ways to implement fabrication. For example, many techniques may be used to deposit a thin film. The following is provided as merely one example. In this example, a microbolometer-type thermal detector with no on-chip control electronics is fabricated. For example, one may begin with any one of several types of wafers, such as silicon. On top of the silicon, an insulating material such as silicon nitride may be applied to keep the device electronic from electrically contacting the substrate. Then a bottom mirror composed of an optional metal such as Cr/Au and one or more alternating index layers for the wavelength range of interest is deposited. For example, in the long-wave infrared ($\lambda$=8 to 14 μm) zinc sulphide and germanium may be used as the alternating index materials. Often these layers each will be of quarter-wave thickness, but there are some designs where a stack with numerically optimized thicknesses may be used to, for example, affect the spectral symmetry of the resonance or to extend the high reflectivity region of the mirror. One of the mirror layers, for example, a top germanium layer, may be doped to act as an actuation electrode. This can ease dielectric charging. Alternatively, the metal layer can be used. The layers can be deposited by any appropriate technique including sputtering, evaporation, PECVD, LPCVD, etc. The bottom mirror can be patterned and etched using, for example, photolithography to form a specific device area. The etching can use, for example, wet, dry, or vapor processes. $SF_6$ or $CF_6$ plasmas for etching Ge, and $H_2$ plasmas for etching ZnS have been used. A metal layer such as Cr/Au may need to be deposited and patterned, to define bottom electrodes. A sacrificial material is deposited next and patterned with vias so that supports and electrical connections are provided for the top mirror. If thermal standoffs (projections) are needed, a second etch process can be performed to make small pits in the sacrificial layer defining the size of the standoffs. The sacrificial material should etch easily without damaging any of the other exposed materials of the device. Two common examples are doped silicon dioxide, which can be etched in hydrofluoric acid, and polyimide, which can be etched in an oxygen plasma. In general, the sacrificial layer will be patterned into a square (or alternate shape) in the general device region. The thickness of the sacrificial layer will typically be several microns if the device is used in the LWIR, and smaller if used in the MWIR. This corresponds to a $\lambda/2$ cavity. A larger cavity may be fabricated but at the expense of extra processing complexity and a smaller tuning range due to extra modes in the mirror reflectivity bands.

The supports can be deposited and patterned either prior to or after the top mirror. Different supports may need to be deposited in different steps as one or two supports will contact the detector, while another support(s) may contact the actuator electrode. The supports can be thin beams which could be comprised of an insulating, poor thermal conductor such as silicon nitride or silicon dioxide with a metal layer on top. In the support metal, it is desirable to use a material with a high ratio of electrical to thermal conductivity. A common material is NiFe. If needed, a protective dielectric can cover the metal, for example to protect against patterning etches or the sacrificial etch. Again high thermal isolation is typically desired. The layers of the top mirror can be quite variable, depending upon the desired time constant, spectral characteristics, etc. One simple structure includes the use of a thin metal, such as Cr or Pd, which serves as an absorber/actuator electrode. A very thin insulating dielectric is deposited followed by a partially transparent doped layer of germanium as the detector layer. A second undoped layer of germanium can be used as a structural/dielectric material. The variations on this basic structure are many and the invention is not limited to these examples.

After the top mirror and supports are deposited and patterned, a common metal, such as Cr/Au plus any passivation dielectrics, may be deposited and patterned in certain areas, such as the bond pads, to make contact with external electronics. Any such process should be designed so as not to degrade or prevent the function of the device region. For example, the passivation dielectric that was over the top mirror may be removed through etching. A sacrificial etch can be used to free the top mirror, except at the supports. Although monolithic approaches to the fabrication, such as the one above, are one preferred embodiment, a multiwafer process is possible. For example, the top mirror can be fabricated on a separated wafer and bonded to the supports while in the sacrificial matrix. The top mirror wafers may then be removed prior to etch release.

Although the present invention has been described with reference to preferred embodiments, workers skilled in the art will recognize that changes may be made in form and detail without departing from the spirit and scope of the invention. As used herein, infrared radiation includes radiation from about 1 μm to about 100 μm. In various configurations, the detector comprises a thermal sensor which is coupled to one or more of the mirrors in the thermal detector. The thermal sensor is positioned within the cavity defined between the two mirrors or is otherwise coincident with one of the mirrors. Any appropriate type of thermal sensor may be used and any appropriate actuation mechanism or mirror may be employed as desired. In on configuration, the thermal sensor comprises material which changes resistance in response to temperature. Further, any appropriate actuation mechanism may be employed.

What is claimed is:

1. A thermal detector configured to detect infrared radiation, comprising:
   first and second spaced apart mirror structures defining a cavity therebetween, the second mirror structure having a first side external to the cavity and a second side positioned closer to the cavity than the first side; and
   a thermal sensor structure coupled with the second mirror structure and at least partially absorbing to infrared radiation and positioned within the cavity, wherein the absorption of the thermal sensor structure varies with direction and wavelength.

2. The thermal detector of claim 1 wherein the spacing between the first and second mirror structures is controllable.

3. The thermal detector of claim 2 including an actuator configured to provide relative movement between the first and second mirror structures.

4. The thermal detector of claim 3 wherein the actuator uses electrostatic force to provide relative movement between the first and second mirror structures.

5. The thermal detector of claim 3 wherein the actuator uses magnetism to provide relative movement between the first and second mirror structures.

6. The thermal detector of claim 1 wherein the cavity provides a resonant cavity for infrared radiation wherein only one frequency band of incoming infrared radiation can be coupled to the thermal sensor.

7. The thermal detector of claim 1 wherein the thermal sensor structure comprises an absorber element and a detector element.

8. The thermal detector of claim 1 wherein the first and second mirror structures are moveable together to reduce the spacing between the first and second mirror structures so the thermal detector is configured to receive broadband radiation.

9. The thermal detector of claim 1 including one or more thermal standoffs configured to reduce contact area between the first and second mirrors.

10. The thermal detector of claim 9 wherein the one or more thermal standoffs are configured to reduce thermal conduction between the first and second mirror structures.

11. The thermal detector of claim 1 wherein at least one of the first and second mirror structures comprises a diffractive optical element.

12. The thermal detector of claim 1 wherein at least one of the first and second mirror structures comprises a grating.

13. The thermal detector of claim 1 wherein at least one of the first and second mirror structures comprises a Fresnel lens.

14. The thermal detector of claim 1 wherein at least one of the first and second mirror structures at least partially defines a Gaussian cavity.

15. The thermal detector of claim 1 including one or more support structures configured to support one or both of the first and second mirror structures.

16. The thermal detector of claim 15 wherein the one or more support structures provides an electrical connection to one or both of the first and second mirror structures.

17. The thermal detector of claim 1 including control circuitry electrically coupled to at least one of the first and second mirror structures to control spacing between the first and second mirror structures.

18. The thermal detector of claim 17 including a substrate including at least one via through the substrate which provides an electrical connection between the control circuitry and the at least one of the first and second mirror structures.

19. A thermal detector configured to detect infrared radiation, the thermal detector comprising:
first and second spaced apart mirror structures defining a cavity therebetween, the second mirror structure having a first side external to the cavity and a second side positioned closer to the cavity than the first side; and
a thermal sensor structure at least partially absorbing to infrared radiation positioned within the cavity and at least partially embedded in the second mirror structure, wherein the absorption of the thermal sensor structure varies with direction and wavelength.

20. The thermal detector of claim 19, wherein the thermal sensor structure comprises an absorber portion and a detector portion.

21. The thermal detector of claim 19, wherein the thermal sensor structure is partially transmissive of infrared radiation.

22. The thermal detector of claim 19, wherein the thermal sensor structure comprises a bolometer.

23. The thermal detector of claim 19, comprising an actuation mechanism configured to provide relative movement between the first and second mirror structures between a first position where the cavity is tuned for sensing in a narrowband mode and a second position where the cavity is tuned for sensing in a broadband mode.

24. The thermal detector of claim 23, wherein first and second mirror structures are positioned closer to each other in the broadband mode than in the narrowband mode.

25. The thermal detector of claim 19, wherein the thermal detector is configured for sensing infrared radiation having a wavelength between about 2 microns and about 14 microns.

26. A method of making a thermal detector, the method comprising:
forming first and second spaced apart mirror structures defining an optical cavity therebetween; and
positioning a thermal sensor structure within the optical cavity, wherein the absorption of the thermal sensor structure varies with direction and wavelength.

27. The method of claim 26, comprising positioning the thermal sensor structure at least partially in contact with one of the first and second mirror structures.

28. The method of claim 27, comprising at least partially embedding the thermal sensor structure within the one of the first and second mirror structures.

29. The method of claim 26, comprising providing an actuation mechanism configured to provide relative movement between the first and second mirror structures between a first position where the cavity is tuned for sensing in a narrowband mode and a second position where the cavity is tuned for sensing in a broadband mode.

30. A method of sensing infrared radiation, the method:
coupling an optical cavity at least partially defined by first and second mirror structures and having a thermal sensor structure positioned within the optical cavity with incoming thermal radiation, wherein the absorption of the thermal sensor structure varies with direction and wavelength,
causing at least a portion of the thermal sensor structure to absorb at least a portion of the coupled infrared radiation; and
detecting at least a portion of the absorbed radiation.

31. The method of claim 30, comprising coupling the optical cavity at a resonant frequency.

32. The method of claim 30, comprising changing the spacing between the first and second mirror structures.

33. The method of claim 30, comprising tuning the optical cavity to detect thermal radiation between about 2 microns and about 14 microns.

34. The method of claim 30, comprising transmitting a portion of the incoming radiation through the thermal sensor structure.

* * * * *